Patented June 12, 1951

2,556,857

UNITED STATES PATENT OFFICE 2,556,857

LOW-TEMPERATURE POLYMERIZATION PROCESSES

Robert M. Thomas and Augustus B. Small, Baton Rouge, La., assignors to Standard Oil Development Company, a corporation of Delaware No Drawing. Application September 4, 1946, Serial No. 694,824

9 Claims. (Cl. 260—85.3)

This invention relates to polymerization processes; relates particularly to the purification of materials, and relates especially to the purification by the use of phosphorus pentoxide of auxiliary substances used with olefinic materials for low temperature copolymerization.

It has been found possible to produce an extremely valuable structural material which is suitable as a replacement for natural rubber by the steps of copolymerizing an isoolefin such as isobutylene with a multi olefin such as isoprene at temperatures within the range between about −40° C. and −164° C. by the application to the cold mixture of a Friedel-Crafts catalyst, preferably in solution in a low-freezing, non-complex-forming solvent. Difficulty is however experienced in obtaining material of the desired characteristics. For satisfactory processing in the factory, especially for the making of automobile inner tubes, it is highly desirable that the material have a Staudinger molecular weight number within the range between about 35,000 and 60,000, and it is also desirable that it show an 8 minute Mooney viscosity value not lower than 40; and at the same time that it show, after curing, a good elongation at break, preferably up to 900% to 1200%, a tensile strength within the range between 2200 and 3200 pounds per square inch and a modulus (that is, pounds pull per square inch to stretch the material by 300%) in the neighborhood of 400 to 600. These values are however difficult to obtain even with the most careful distillational purification of the raw materials.

According to the present invention, it is now found that if the auxiliary raw materials such as the diluent and catalyst solvent are treated in liquid phase, with phosphorus pentoxide, some harmful impurity or impurities probably present to the extent of a small fraction of 1%, are removed and a much better control of the reaction is therefore obtainable and superior products are produced. This procedure of treating the diluent or catalyst solvent or both with phosphorus pentoxide (phosphoric anhydride) is especially advantageous when applied to methylene chloride which is thereafter used as a diluent for the polymerization reaction.

Thus the present invention treats certain of the raw materials for a low temperature olefinic polymerization reaction, including especially methylene chloride by passing them, in liquid phase, over solid anhydrous phosphorus pentoxide followed by flashing off the material, which leaves the harmful impurities combined with the solid $P_2O_5$ as non-volatile complexes; and thereafter polymerizing the olefinic material in the presence of the purified auxiliary substances by a Friedel-Crafts catalyst at a temperature below 0° C. Other objects and details of the invention will be apparent from the following description:

The raw materials for the polymerization process of the present invention consist of isobutylene, preferably of at least 96 to 98% purity; a multi olefin such as butadiene or isoprene or piperylene or dimethyl butadiene, or dimethallyl or myrcene, or the like; any organic compound containing two or more carbon to carbon double double linkages and from 4 to 14 inclusive carbon atoms per molecule being more or less advantageously useable. A third component of the mixture consists of a diluent which preferably is a halogen-substituted hydrocarbon, preferably aliphatic, having a freezing point below the polymerization temperature. The diluent may advantageously consist of one or more of such substances as methyl chloride, methylene chloride, chloroform, ethyl chloride, ethylene chloride, various of the fluorine substituted aliphatic compounds, various of the fluoro chloro compounds, and the like. Present information indicates that any halogen-substituted aliphatic compound which has a freezing point below the polymerization temperature is useful for the present invention without regard to the number of halogen substituents and these compounds are described for the purposes of the present invention in terms of the above definition as halo-substituted aliphatics, without regard to the number of halogen substituents per molecule. Furthermore, these halo-substituted aliphatics may be used singly, or in admixture, or diluted with various of the lower boiling hydrocarbons, any of the aliphatic hydrocarbons having freezing points below the polymerization temperature being suitable.

According to the present invention, a choice is made of the desired olefinic materials both as to specific compound mixture; and proportions, according to the characteristics of the polymer desired. If the material is to be rubbery in character, the isoolefin is preferably isobutylene, the multi olefin may be any of the above-indicated substances and the mixture preferably contains a major proportion of isobutylene and a minor proportion of the multi olefin. If a hard resin is to be produced, a much wider choice of mono olefins is available, any of the normal mono olefins from 3 to 20 carbon atoms, and any of the isoolefins from 5 to 20 carbon atoms being more or less useful. The mixture also contains a diluent, which is preferably selected from the above indicated list.

According to the process of the invention, the diluent or catalyst solvent or both may be treated with phosphorus pentoxide, then incorporated as a component of the above described mixture. A substantial gain in quality of the product is obtainable by treating the halogen-substituted aliphatic diluent with phosphorus pentoxide, and similar gains may be made by treating the catalyst solvent with phosphorus pentoxide ($P_2O_5$).

The polymerizate mixture containing refined diluent is then polymerized at the appropriate temperature. For the making of rubber-like bodies or rubber substitutes which can be cured into materials capable of high elongation, the polymerization is preferably conducted at temperatures between $-40°$ C. and $-165°$ C.; the preferred temperature range being between $-40°$ C. and $-103°$ C. The reduced temperature is conveniently obtained by the use of a refrigerant, in a refrigerating jacket on the reactor, and, if desired, on storage and mixing containers. For a refrigerant, such substances as liquid propane, yielding a temperature of about $-40°$ C. may be used, but better results are obtained using such substances as liquid or solid $CO_2$ in the refrigerating jacket, or liquid ethane yielding a jacket temperature of about $-88°$ C. or liquid ethylene yielding a jacket temperature of about $-103°$ C. or the various fluoro halogenated aliphatic compounds may be used, these compounds yielding various temperatures below $-40°$ C. according to the particular compound chosen. In some instances, liquid methane, especially under pressure is conveniently usable, although for most polymerizations the temperature of $-164°$ C. is undesirably low.

In some instances, internal refrigeration may be used by mixing an appropriate refrigerant directly with the polymerizate mixture. Such substances as liquid propane, liquid or solid carbon dioxide, liquid ethane, liquid ethylene or various of the fluoro halogenated aliphatics may be used. For the internal refrigerant, however, it is essential that the material used be non-reactive with the catalyst, which rules out sulfur dioxide and some other of the other refrigerants, although it does not rule out either carbon dioxide or ethylene. If a saturated refrigerant is used such as ethane or a very unreactive unsaturate such as ethylene, the $P_2O_5$ treatment may be used to purify the internal refrigerant. This is not applicable to materials that will react with $P_2O_5$.

When the reactor contains the desired amount of mixed olefins and diluent, and has been cooled to the desired polymerization temperature, the mixture is polymerized by the addition thereto of a Friedel-Crafts active metal halide catalyst in solution in a low-freezing, non-complex-forming solvent. For the active metal halide catalyst, any of the Friedel-Crafts catalysts disclosed by N. O. Calloway in his article on "The Friedel-Crafts Synthesis" printed in the issue of "Chemical Reviews" published for the American Chemical Society at Baltimore in 1935, in volume XVII, No. 3, the article beginning on page 327, the list being particularly well shown on page 375, may be used. In addition, such double salts as aluminum chloro bromide or the various aluminum chloro alk oxides and the like may also be advantageously used. In this polymerization reaction, it should be noted that boron trifluoride in gaseous form will not yield a curable copolymer with a mixture containing butadiene because of the impossibility of obtaining a sufficiently high concentration before the polymerization reaction starts. However, boron trifluoride in concentrations from 5 to 45% in an appropriate solvent may be used to polymerize most of the above-mentioned mixtures. Titanium tetra chloride, being liquid, may be used directly, but it also yields a better polymer if it is dissolved in a low-freezing, non-complex-forming solvent in order to get a more satisfactory dispersion in the cold polymerizate mixture. It should be noted that solid aluminum chloride has too low a solubility to cause any polymerization and therefore solid aluminum chloride is wholly useless.

For the catalyst solvent it is required only that the liquid show solvent powers for the catalyst substance which may be defined as dissolving not less than 0.1%; that it have a freezing point below $0°$ C., thereby being low-freezing; and that it does not separate from the solution on evaporation of the solvent a compound between the solvent and the Friedel-Crafts catalyst, or that upon the addition of the solvent to the solute in the form of a vapor at constant temperature, there will occur a substantially continuous change in the composition of the catalyst phase and a continuous increase in the partial pressure of the solvent, the catalyst substances being recoverably unchanged by removal of the solvent.

The catalyst solution may be delivered to the reaction mixture in any convenient manner, although in most reactions it is conveniently delivered in the form of a fine high-pressure jet into the body of the vigorously stirred, cold polymerizate mixture. Alternatively, it may be applied in the form of a fine spray to the surface of the strongly stirred, cold mixture, or application may be in other ways which will be evident to those skilled in the art.

The reaction proceeds promptly to yield the desired copolymer which may precipitate out in the form of a slurry or with a limited number of diluents may remain in solution. The polymerization when highly purified materials are used may be carried to a high conversion depending upon the per cent diolefin employed in the polymerizate mixture. With low diolefin feeds, conversions in excess of 80% are permissible with both batch and continuous process. As the diolefin concentration increases, the conversion decreases, so that at approximately 12% isoprene, 50% conversion is about maximum. When a continuous process is used, it is usually desirable to carry the reaction no further than the polymerization of 50% to 70% of the olefinic material present. When batch reactions are used, the polymerization usually should be carried only to the stage of from 60 to 80% utilization of the olefinic material present. This characteristic is due to the fact that with almost none of the mixtures do the two olefins copolymerize at the same rate. Thus, with isobutylene and butadiene, the butadiene is very resistant to polymerization and to copolymerize from 2 to 4 or 5% of butadiene into the copolymer, there must be present in the olefinic mixture from 20 to 45% or even more butadiene. In consequence, when the polymerization has been carried to a 20% utilization stage, approximately 19% of the isobutylene present has been polymerized and removed from the mixture as solid polymer, while only 2 or 3% of the butadiene has been removed. In consequence, the mixture after partial polymerization is much higher in butadiene than at the start, and a different polymer much higher in butadiene is obtained; this lack of homogeneity, of course, being highly undesirable.

When the polymerization has been carried to the desired stage, the mixture of diluent, unreacted olefins and polymer is recovered in any convenient way. The preferred method is by discharging the cold mixture into warm water which volatilizes out the isobutylene, the butadiene and usually the diluent, leaving a slurry of solid polymer in water which may be dried in any convenient way. Alternatively, the polymer may be discharged into warm naphtha in which it dissolves with volatilization of the same components; from which solution the polymer may be recovered in any convenient manner as by vacuum separation or by flashing off the solvent, or the like.

The resulting polymer is a white solid with a molecular weight preferably within the range between about 35,000 and about 60,000, although it is readily made with either lower or higher molecular weights. The iodine number preferably lies between about 0.5 and about 50, with the most advantageous range between about 1 and about 10. The iodine number is of course controlled by the proportion of multi olefin in the copolymerizate mixture as well as the character of the multi olefin. The resulting polymer is plastic and can be milled in much the same way as rubber. Also, it is advantageously compounded with carbon black, stearic acid, zinc oxide and an appropriate curing agent. The polymer will cure with sulfur alone, but time and temperature requirements are unduly high and it cures much better in the presence of a thiuram type accelerator such as tetra methyl thiuram disulfide (Tuads), or any of the conventional natural rubber accelerators depending upon the desired vulcanizate characteristics. Alternatively, such curing agents as the quinone amines especially para quinone dioxime, or the like, are particularly useful, but all of the quinone amines, their analogs, homologs, esters and the like are more or less useful. Another excellent curing agent is a dinitroso compound, either aliphatic or aromatic, although the aromatic is preferred. When cured, the polymer may show a tensile strength within the range between 1800 pounds per square inch and about 4500 pounds per square inch with an elongation at break ranging from 500% to 1200%, depending upon the character and amount of compounding agents. The material usually shows a relatively low modulus ranging from 200 to 400 pounds per square inch pull to elongate the material by 300%.

It has also been found possible to produce an extremely valuable hard resin by the copolymerization at low temperature of a mixture containing a relatively large proportion of a multi olefin such as butadiene and a relatively smaller proportion of an olefin such as the octene known as "dimer," that is, diisobutylene; or the hexene known as dipropylene or other of the normal olefins having 3 to 20 carbon atoms per molecule, or isoolefins having 5 to 20 carbon atoms per molecule, the same list of multi olefins, as above disclosed, having from 4 to 14 carbon atoms per molecule, being particularly suitable for the multi olefinic copolymerizate. These materials likewise are desirably diluted with a halogen substituted hydrocarbon, or other diluent such as the low boiling hydrocarbons, which may be treated with phosphorous pentoxide in a purification step. These mixtures are conveniently polymerized at temperatures ranging from about +10° C. down to about −35° C. The resulting polymer is a hard, somewhat brittle resin, having a melting point within the range between about 70° C. and 130° C., being particularly useful for paint or varnish resin, since it is soluble in linseed oil and readily heat bodyable therewith.

Broadly, the method of utilization of the phosphorus pentoxide for purposes of purification is to mix the $P_2O_5$ and the solvent to be purified and let them stand for a substantial length of time ranging from one-half hour to 24 hours, depending upon the particular solvent or diluent being treated and the character of the impurities in it. Alternatively, it is possible occasionally to obtain a satisfactory purification by passing a relatively very slow stream of the diluent or solvent through a thick bed of the phosphorus pentoxide, although this is less satisfactory because of the danger of "channeling" in the bed, and irregular treatment of various portions of the material. The material may be treated at a temperature which is at or below the boiling point of the liquid at atmospheric pressure, but, as a rule, it is preferable that the treatment be conducted under pressure with the temperature near to room temperature, preferably at or somewhat above room temperature. However, with any type of treatment, it is highly desirable that the treated solvent be separated from the $P_2O_5$ by a distillation or "flashing" or boiling off step, followed by a recondensation either by compression or preferably by cooling the material below the boiling point. The exact mechanics of the purification are, to the present, practically unknown although it is suspected that the purification occurs by some sort of a polymerization reaction of the impurities which permits them to be adsorbed on, or combined with, the phosphorus pentoxide.

EXAMPLE 1

A supply of methyl chloride was treated as above outlined by passing the liquid methyl chloride through a bed of solid phosphorus pentoxide with a total time of contact of about 8 hours. After flashing and recondensation, this material was used in the preparation of a polymerizate feed for the making of the desired copolymer. For this feed a supply of isobutylene of approximately 99% purity was used and a supply of isoprene of approximately 99% purity was also used. The olefinic mixture was made in varying proportions as shown in Table I, 3%, 6% and 12% of isoprene being used. This mixture was then diluted with 2 volumes of the $P_2O_5$-treated methyl chloride and the mixture was then cooled to a temperature of approximately −100° C. and polymerized by the addition to the cold mixture of a catalyst consisting of an 0.6% solution of aluminum chloride in $P_2O_5$-treated methyl chloride. The catalyst was added in the form of a fine high pressure jet into the body of rapidly stirred cold olefinic mixture. The resulting polymers from these variously proportioned mixtures were then recovered by dumping the polymerization mixtures into warm water, and the % conversion, catalyst efficiency, molecular weight and Mooney viscosity were determined yielding the values shown in Table I.

*Table I*

| Per Cent Isoprene in Feed | Per Cent Conversion | Catalyst Efficiency | Product | |
|---|---|---|---|---|
| | | | Mol. Wt. | Mooney Viscosity |
| 3 | 40 | 1,380 | 63,000 | 83 |
| 3 | 59 | 2,380 | 75,000 | 84 |
| 6 | 60 | 1,200 | 55,000 | 82 |
| 12 | 36 | 540 | 44,000 | 52 |

It will be noted that the % conversion of the 6% and 12% isoprene feeds were comparatively high and that both the molecular weight and the Mooney viscosity showed excellent values.

For comparison purposes, a similar series of polymerizations using the same 99% isobutylene and 99% isoprene with ordinary commercial methyl chloride (not $P_2O_5$-treated) were conducted as shown in Table II.

*Table II*

| Per Cent Isoprene in Feed | Per Cent Conversion | Catalyst Efficiency | Mol. Wt. of Product | Mooney of Product |
|---|---|---|---|---|
| 3 | 21 | 348 | 75,000 | |
| 3 | 13 | 200 | 68,000 | |
| 3 | 21 | 276 | 65,000 | 76 |
| 3 | 19 | 300 | 64,000 | |
| 6 | 27 | 326 | 51,000 | |
| 6 | 17 | 214 | 47,000 | 73 |
| 6 | 25 | 325 | 45,000 | |
| 10 | 20 | 206 | 30,000 | |
| 10 | 24 | 250 | 29,000 | 22 |
| 10 | 18 | 193 | 31,000 | |

It will be noted that with 3% isoprene, the range of molecular weight in the two different series of polymerizations was about the same, but the Mooney viscosity was considerably higher when the $P_2O_5$-treated methyl chloride was used. With the 6% isoprene polymerizations, the molecular weight, catalyst efficiency and Mooney viscosity all were considerably higher for the $P_2O_5$-treated material. These polymerizations also show that a 12% isoprene mixture diluted with the $P_2O_5$-treated methyl chloride yields a much higher catalyst efficiency, per cent conversion, molecular weight and Mooney viscosity than is obtainable with a 10% isoprene feed using the ordinary commercial methyl chloride. The difference in these higher isoprene polymerizations is outstandingly great and also, the permissible per cent conversion of olefinic material is much higher. It may be noted that in the ordinary reaction, to obtain useable products with higher isoprene percentages, the per cent yield must be kept at a very much lower value than is possible with lower isoprene feeds. This is due to a combination poisoning effect by impurities and by the isoprene together, which apparently is more than cumulative since with the methyl chloride impurities removed, the poisoning effect of the isoprene is very greatly reduced.

EXAMPLE 2

The purification process of the present invention is particularly applicable to methylene chloride, $CH_2Cl_2$. From the point of view of the polymerizations, this material has many desirable characteristics; that is, a boiling point at about 39.8° C. (above room temperature), a freezing point of about −96.7° C., which is extremely convenient for the polymerization, an excellent solvent capacity for aluminum chloride, relatively good non-solvent properties for the olefinic polymer at low temperatures, and a fairly good solvent property at temperatures above 0° C. for the copolymer, complete intersolubility with the olefins at the polymerization temperature, a relatively very low toxicity as compared to all of the other chlorinated hydrocarbons and a very high stability due to the fact that each carbon atom carries two halogens; also the material is readily available as a by-product from the commercial production of chloroform from carbon tetra chloride. In the present polymerization reaction, the higher boiling point gives a very greatly reduced loss of diluent in the polymerization and processing steps. There is also a very great reduction in the formation of reaction poisoning bodies during recycling because of the increased stability, which is very important, and many other very valuable characteristics occur. However, the method of commercial production leaves the material contaminated with impurities which are found to be extremely difficult to remove by any of the ordinary purification processes, especially distillation, but by the $P_2O_5$-treating step, it is possible to remove the impurities to such an extent as to make useable all of the other good properties of the material, which can not be used if the methylene chloride is impure.

A series of polymerizations were conducted as indicated in Example 1, using a mixture consisting of 3% isoprene and 97% of isobutylene, both of a purity of approximately 99%. The characteristics of the mixture and the characteristics of the resulting polymer are shown in Table III:

*Table III*

| Run # | Feed Solvent | Diluent Ratio | Catalyst Solvent | Mooney | Tensile [1] | 400% Modulus[1] |
|---|---|---|---|---|---|---|
| 489 | Methylene Chloride [2] | 2:1 | Methyl Chloride | [3] 34 | 2,500 | 1,525 |
| 603 | ____do [4] | 2:1 | ____do | 66 | 3,150 | 1,425 |
| 605 | ____do | 1:2 | ____do | 77 | 3,100 | 1,625 |
| 607 | ____do | 2:1 | Methylene Chloride [4] | 44 | 2,800 | 1,150 |
| 609 | ____do | 0.5:1 | ____do | [5] 16 | 1,550 | 875 |
| 608 | ____do | 0.5:1 | ____do | [5] 17 | 1,500 | 775 |
| 610 | ____do | 0.5:1 | ____do | 33 | 2,500 | 1,050 |

[1] 40-minute cure at 307° F.
[2] Purified by fractionation taking 80% overhead; redistilling over $AlCl_3$, washing and drying.
[3] All Mooney values given are for 1.5 minute determinations.
[4] Methylene chloride purified by treatment liquid phase with $P_2O_5$ and taken overhead by flashing.
[5] These values are low due to the use of relatively concentrated catalyst (0.5 g./100 cc. or slightly higher), and are intended to show the phenomenally high modulus for such "soft" polymers.

EXAMPLE 3

A polymerization was conducted utilizing ethylidene chloride which had been stirred with phosphorus pentoxide for a time of several hours, distilled off directly from the phosphorus pentoxide, condensed and used both as catalyst solvent and diluent in a polymerization reaction. The reaction proceeded smoothly and easily and produced polymers which differed from polymers produced by the use of commercial methyl chloride in much the same way and to about the same extent as those shown in Examples 1 and 2; the same outstanding improvement being present.

EXAMPLE 4

A sample of methyl bromide was treated with phosphorus pentoxide, as above outlined, and the treated material used both as diluent, and as catalyst solvent with a sample of aluminum bromide. In this instance also the polymerization proceeded smoothly to yield a substantially improved polymer closely similar to those previously outlined in Examples 1 and 2. In this instance, the polymerization reaction took a much slower course.

EXAMPLE 5

A supply of ethyl chloride was purified, as above outlined, and used both as diluent and a catalyst solvent for a polymerization procedure, and similarly improved results were obtained.

EXAMPLE 6

A supply of mixed alkyl fluoro chlorides having a boiling point somewhat below room temperature and a freezing point somewhat below $-100°$ C. was similarly treated with phosphorus pentoxide and used for diluent in a polymerization reaction in which the catalyst had been prepared by dissolving 0.7% of aluminum chloride in a supply of methyl chloride which also had been treated with phosphorus pentoxide. This reaction proved to be extremely effective and the polymer showed relatively very low solubility in the fluoro chloride diluent with the result that a highly advantageous slurry of polymer was obtained which was of similarly excellent quality compared to those produced in Examples 1 and 2. The tensile strength and modulus were determined upon samples compounded according to the following recipe and cured for 40 minutes at 307° F.:

|  | Parts |
|---|---|
| Polymer | 100 |
| Zinc oxide | 5 |
| Stearic acid | 3 |
| Carbon black | 50 |
| Tuads (tetramethyl thiuram disulfide) | 1 |
| Sulfur | 2 |
| Captax | 0.5 |

These results show the conspicuous improvement in the characteristics of the polymer when the methylene chloride has been treated with $P_2O_5$ and they show the very greatly increased tensile strength and modulus obtainable with the use of purified methylene chloride compared to the use of commercial methyl chloride as such.

Thus the process of the invention treats one or more of the auxiliary components of a low temperature olefinic polymerization reaction mixture with phosphorus pentoxide to remove trace quantities of interfering impurities and thereafter polymerizes the olefinic material at temperatures ranging from $-40$ to $-164°$ C. by the application of a Friedel-Crafts type catalyst, to yield a copolymer having superior physical properties.

While there are above disclosed but a limited number of embodiments of the device of the invention, it is possible to produce still other embodiments without departing from the inventive concept herein disclosed and it is therefore desired that only such limitations be imposed on the appended claims as are stated therein or required by the prior art.

The invention claimed is:

1. In a low temperature olefinic polymerization process in which a polymerization catalyst consisting of a Friedel-Crafts active metal halide in solution in a halo-substituted aliphatic compound which is liquid below 0° C., is used for the polymerization of an olefinic mixture consisting of a multi-olefin having from 4 to 14, inclusive, carbon atoms per molecule and an iso-olefin, the step in combination of treating the halo-substituted aliphatic compound with a phosphorous oxide and separating the halo-substituted aliphatic compound from the phosphorus oxide, and thereafter dissolving in the treated halo aliphatic compound the Friedel-Crafts active metal halide catalyst, and subsequently adding the catalyst solution to the said olefinic mixture for the polymerization at a temperature between $-40°$ C., and $-164°$ C.

2. In a low temperature olefinic polymerization process in which a polymerization catalyst consisting of a Friedel-Crafts active metal halide in solution in a halo-substituted aliphatic compound which is liquid below 0° C., is used for the polymerization of an olefinic mixture consisting of a multi-olefin having from 4 to 14, inclusive, carbon atoms per molecule and an iso-olefin, the step in combination of treating the halo-substituted aliphatic compound with a phosphorous oxide and distilling the halo-substituted aliphatic from the phosphorous oxide and recondensing, and thereafter dissolving in the treated halo aliphatic compound the Friedel-Crafts active metal halide catalyst, and subsequently adding the catalyst solution to the said olefinic mixture for the polymerization at a temperature between $-40°$ C., and $-164°$ C.

3. In a low temperature olefinic polymerization process the steps in combination of mixing together a major proportion of isobutylene with a minor proportion of a multi-olefin having from 4 to 14, inclusive, carbon atoms per molecule, separately treating a halo-substituted aliphatic compound which is liquid at the polymerization temperature with a phosphorous oxide and separating the halo-substituted aliphatic compound from the phosphorus oxide, dissolving therein a Friedel-Crafts active metal halide, and adding the metal halide solution to the olefinic mixture at a temperature within the range between $-40°$ C., and $-164°$ C., to produce a curable olefinic copolymer having superior cured physical properties.

4. In a low temperature olefinic polymerization process the steps in combination of mixing together a major proportion of isobutylene with a minor proportion of a multi-olefin having from 4 to 14, inclusive, carbon atoms per molecule, separately treating a halo-substituted aliphatic compound which is liquid at the polymerization temperature with a phosphorous oxide, distilling the halo compound from the phosphorous oxide and recondensing, dissolving therein a Friedel-Crafts active metal halide, and adding the metal halide solution to the olefinic mixture at a temperature within the range between −40° C., and −164° C., to produce a curable olefinic copolymer having superior cured physical properties.

5. In a low temperature olefinic polymerization process the steps in combination of mixing a major proportion of isobutylene with a minor proportion of isoprene, separately treating methyl chloride with phosphorous pentoxide, dissolving aluminum chloride in the treated methyl chloride and polymerizing the isobutylene-isoprene mixture at a temperature within the range between −40° C., and −164° C., by the application thereto of the solution of aluminum chloride in treated methyl chloride.

6. In a low temperature olefinic polymerization process the steps in combination of mixing a major proportion of isobutylene with a minor proportion of isoprene, separately treating ethyl chloride with phosphorous pentoxide, dissolving aluminum chloride in the treated ethyl chloride and polymerizing the isobutylene-isoprene mixture at a temperature within the range between −40° C., and −164° C., by the application thereto of the solution of aluminum chloride in treated ethyl chloride.

7. In a low temperature olefinic polymerization process the steps in combination of mixing a major proportion of isobutylene with a minor proportion of butadiene, separately treating methyl chloride with phosphorous pentoxide, dissolving aluminum chloride in the treated methyl chloride and polymerizing the isobutylene-butadiene mixture at a temperature within the range between −40° C., and −164° C., by the application thereto of the solution of aluminum chloride in treated methyl chloride.

8. In a low temperature olefinic polymerization process the steps in combination of mixing a major proportion of isobutylene with a minor proportion of isoprene, separately treating methylene chloride with phosphorous pentoxide, dissolving aluminum chloride in the treated methylene chloride and polymerizing the isobutylene-isoprene mixture at a temperature within the range between −40° C., and −164° C., by the application thereto of the solution of aluminum chloride in treated methylene chloride.

9. In a low temperature olefinic polymerization process the steps in combination of mixing a major proportion of isobutylene with a minor proportion of isoprene, separately treating a halo substituted aliphatic compound having from 1 to 2 carbon atoms and from 1 to 3 halogen substituents with phosphorous pentoxide, dissolving aluminum chloride in the treated halo aliphatic and polymerizing the isobutylene-isoprene mixture at a temperature within the range between −40° C., and −164° C., by the application thereto of the solution of aluminum chloride in treated halo aliphatic.

ROBERT M. THOMAS.
AUGUSTUS B. SMALL.

REFERENCES CITED

The following references are of record in the file of this patent:

UNITED STATES PATENTS

| Number | Name | Date |
| --- | --- | --- |
| 2,113,654 | Ipatieff | Apr. 12, 1938 |
| 2,356,128 | Thomas | Aug. 22, 1944 |

OTHER REFERENCES

Ellis—"The Chemistry of Petroleum Derivatives" 1934—New York, page 903.

Annalen Der Chemie—424 (1921) page 19.